(12) United States Patent
Forutanpour

(10) Patent No.: US 11,610,372 B2
(45) Date of Patent: Mar. 21, 2023

(54) METHODS AND APPARATUS FOR MULTIPLE LENS DISTORTION CORRECTION

(71) Applicant: QUALCOMM Incorporated, San Diego, CA (US)

(72) Inventor: Bijan Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/813,534

(22) Filed: Mar. 9, 2020

(65) Prior Publication Data

US 2021/0110611 A1 Apr. 15, 2021

Related U.S. Application Data

(60) Provisional application No. 62/914,379, filed on Oct. 11, 2019.

(51) Int. Cl.
*G06T 19/00* (2011.01)
*G06T 15/04* (2011.01)
(Continued)

(52) U.S. Cl.
CPC ............ *G06T 19/006* (2013.01); *G06T 5/006* (2013.01); *G06T 15/04* (2013.01); *G06T 17/20* (2013.01)

(58) Field of Classification Search
None
See application file for complete search history.

(56) References Cited

U.S. PATENT DOCUMENTS 10,403,032 B2   9/2019  Schmalstieg et al.
10,460,426 B2  10/2019  Jones et al.
(Continued)

FOREIGN PATENT DOCUMENTS

WO   2019140414 A1   7/2019

OTHER PUBLICATIONS

International Search Report and Written Opinion—PCT/US2020/050743—ISA/EPO—dated Dec. 9, 2020.
(Continued)

*Primary Examiner* — Michael J Cobb
(74) *Attorney, Agent, or Firm* — Procopio, Cory, Hargreaves & Savitch LLP

(57) ABSTRACT

The present disclosure relates to methods and apparatus for display or graphics processing. Aspects of the present disclosure can calculate first location information based on a first image mesh. Further, aspects of the present disclosure can determine a first UV image based on the calculated first location information. Additionally, aspects of the present disclosure can calculate second location information based on a second image mesh and the determined first UV image. Aspects of the present disclosure can also determine a second UV image based on the calculated second location information. Aspects of the present disclosure can also generate a third image mesh based on the determined second UV image. Also, aspects of the present disclosure can calculate third location information based on the third image mesh and a camera image. Aspects of the present disclosure can also determine a display image based on the calculated third location information.

40 Claims, 8 Drawing Sheets

(51) Int. Cl.
*G06T 17/20* (2006.01)
*G06T 5/00* (2006.01)

(56) References Cited

U.S. PATENT DOCUMENTS

| | | | |
|---|---|---|---|
| 2001/0020948 A1* | 9/2001 | Piazza | G06T 15/04 |
| | | | 345/586 |
| 2016/0253795 A1* | 9/2016 | Cole | G06T 11/40 |
| | | | 345/426 |
| 2016/0373734 A1 | 12/2016 | Cole et al. | |
| 2018/0262745 A1* | 9/2018 | Cole | H04N 13/156 |
| 2018/0270417 A1* | 9/2018 | Suitoh | G06T 3/4038 |
| 2018/0315222 A1* | 11/2018 | Jones | G06T 11/005 |
| 2019/0057536 A1 | 2/2019 | Fenney | |
| 2019/0156555 A1 | 5/2019 | Lo et al. | |
| 2019/0222824 A1* | 7/2019 | Sheridan | H04N 13/344 |
| 2019/0289277 A1 | 9/2019 | Cumming | |
| 2020/0007845 A1* | 1/2020 | Fukuyasu | H04N 5/23238 |
| 2021/0099686 A1* | 4/2021 | Panchagnula | H04N 13/194 |

OTHER PUBLICATIONS

Johnson T., et al., "A Personal Surround Environment: Projective Display with Correction for Display Surface Geometry and Extreme Lens Distortion", IEEE Virtual Reality Conference VR '07, Mar. 10-14, 2007, Mar. 2007 (Mar. 2007), pp. 147-154, XP031080306, ISBN : 978-L-4244-0905-1, Sections 2.1.2 and 3.2.

* cited by examiner

METHODS AND APPARATUS FOR MULTIPLE LENS DISTORTION CORRECTION

CROSS REFERENCE TO RELATED APPLICATION(S)

This application claims the benefit of U.S. Provisional Application Ser. No. 62/914,379, entitled "METHODS AND APPARATUS FOR MULTIPLE LENS DISTORTION CORRECTION" and filed on Oct. 11, 2019, which is expressly incorporated by reference herein in its entirety.

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a headset, a head mounted display (HMD), a client device, a server, a display processing unit, a display processor, a central processing unit (CPU), a graphics processing unit (GPU), or any apparatus that can perform display or graphics processing. The apparatus can determine first image information based on a first image. Also, the apparatus can generate a first image mesh based on the determined first image information. The apparatus can also determine second image information based on a second image. Moreover, the apparatus can generate a second image mesh based on the determined second image information. The apparatus can also calculate first location information based on a first image mesh. Further, the apparatus can determine a first horizontal (U) vertical (V) (UV) image based on the calculated first location information. Additionally, the apparatus can calculate second location information based on a second image mesh and the determined first UV image. The apparatus can also determine a second UV image based on the calculated second location information. The apparatus can also generate a third image mesh based on the determined second UV image. The apparatus can also calculate third location information based on the third image mesh and a camera image. The apparatus can also determine a display image based on the calculated third location information. The apparatus can also calculate length (X) height (Y) depth (Z) (XYZ) location information based on the first location information. The apparatus can also determine a first XYZ image based on the calculated XYZ location information.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
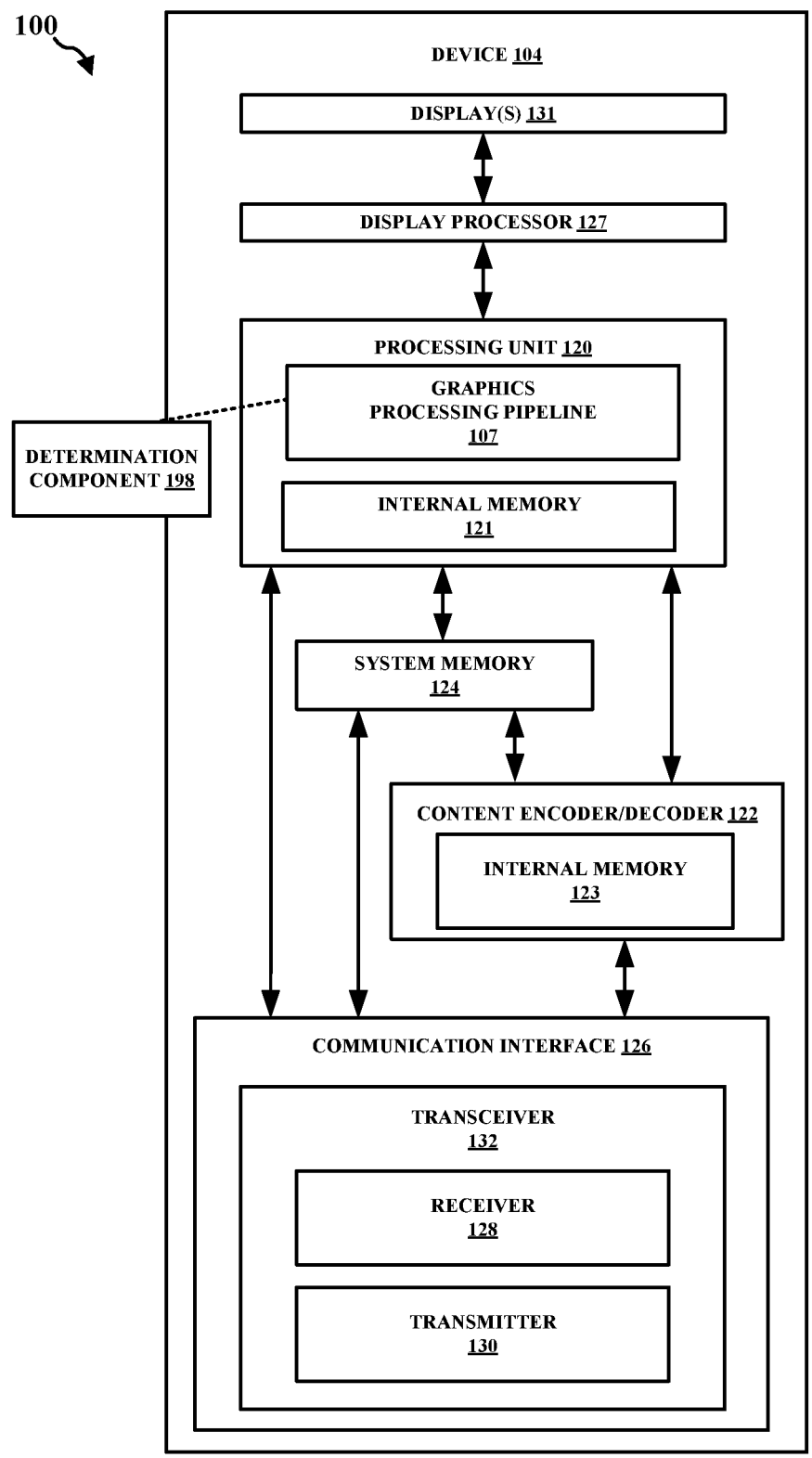
FIG. 1 is a block diagram that illustrates an example content generation system in accordance with one or more techniques of this disclosure.

Lens distortion correction can be applied to multiple lenses, where each lens distorts an input image. Some aspects of lens distortion correction can utilize double pass rendering for the distortion correction. In double pass rendering, the camera image can be used as an input image. However, double pass rendering can result in a long rendering time and/or increased latency in an augmented reality (AR) context. This can also result in increased GPU texture memory access, which can be costly. Aspects of the present disclosure can utilize a single pass rendering, where a single three dimensional (3D) render pass can accomplish multiple lens distortion corrections simultaneously. This single pass rendering can provide a number of advantages, such as a faster rendering time and/or reduced latency. This can also result in less GPU data bandwidth usage. Additionally, this can result in reduced GPU computation per vertex and pixel and/or reduced GPU texture memory access. Single pass rendering can also result in improved or sharper image quality.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using another structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software.

Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second displays may receive different frames for presentment thereon. In other examples, the first and second displays may receive the same frames for presentment thereon. In further examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static RAM (SRAM), dynamic RAM (DRAM), erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that the internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine first image information based on a first image. The determination component 198 can also be configured to generate a first image mesh based on the determined first image information. The determination component 198 can also be configured to determine second image information based on a second image. The determination component 198 can also be configured to generate a second image mesh based on the determined second image information. The determination component 198 can also be configured to calculate first location information based on a first image mesh. The determination component 198 can also be configured to determine a first UV image based on the calculated first location information. The determination component 198 can also be configured to calculate second location information based on a second image mesh and the determined first UV image. The determination component 198 can also be configured to determine a second UV image based on the calculated second location information. The determination component 198 can also be configured to generate a third image mesh based on the determined second UV image. The determination component 198 can also be configured to calculate third location information based on the third image mesh and a camera image. The determination component 198 can also be configured to determine a display image based on the calculated third location information. The determination component 198 can also be configured to calculate length (X) height (Y) depth (Z) (XYZ) location information based on the first location information. The determination component 198 can also be configured to determine a first XYZ image based on the calculated XYZ location information.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
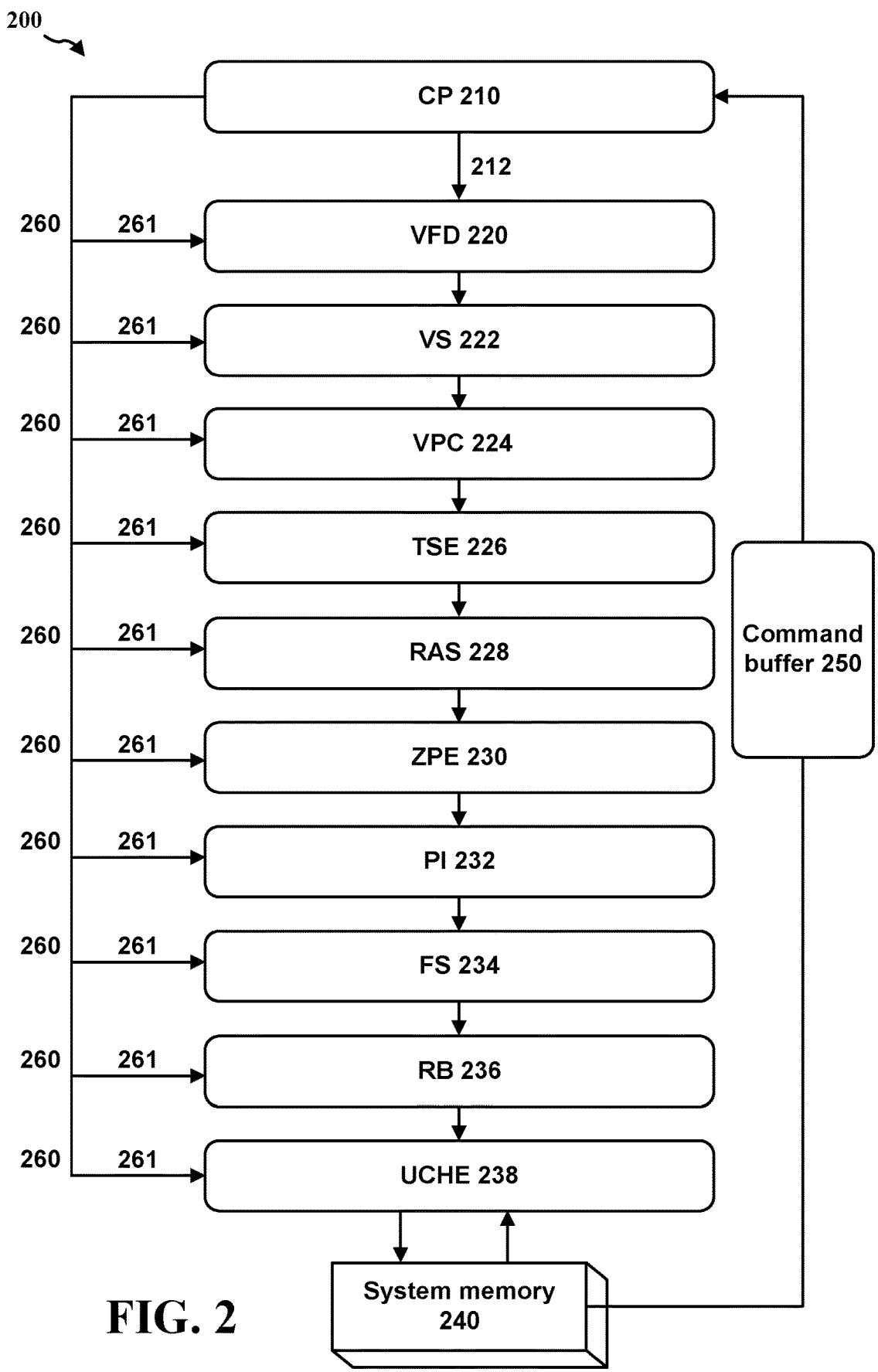
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects of rendering, there can be multiple processing phases or passes. For instance, the rendering can be performed in two passes, e.g., a visibility pass and a rendering pass. During a visibility pass, a GPU can input a rendering workload, record the positions of primitives or triangles, and then determine which primitives or triangles fall into which portion of a frame. In some aspects of a visibility pass, GPUs can also identify or mark the visibility of each primitive or triangle in a visibility stream. During a rendering pass, a GPU can input the visibility stream and process one portion of a frame at a time. In some aspects, the visibility stream can be analyzed to determine which primitives are visible or not visible. As such, the primitives that are visible may be processed. By doing so, GPUs can reduce the unnecessary workload of processing or rendering primitives that are not visible.

Aspects of the present disclosure can be apply to a number of different types of content, e.g., virtual reality (VR) content, augmented reality (AR) content, and/or extended reality (XR) content. In VR content, the content displayed at the user device can correspond to augmented content, e.g., content rendered at a server or user device. In AR or XR content, a portion of the content displayed at the user device can correspond to real-world content, e.g., objects in the real world, and a portion of the content can be augmented content. Also, the augmented content and real-world content can be displayed in an optical see-through or a video see-through device, such that the user can view real-world objects and augmented content simultaneously.

In some aspects, in VR camera see-through mode, a VR headset can be utilized as an AR headset. For example, two external cameras pointing outward can capture real-world objects, e.g., in left and right camera images. The left and right camera images can also be displayed in an internal LCD or OLED display. Additionally, a pair of display lenses can be mounted in front of the display. The user can then view the external world via the display lens, the display, and/or the external camera. In some aspects, the external camera can be referred to as a tracking camera, as it can track images in the real world. So the images shown on the display or client device can be the images that are tracked by the tracking camera. As such, the real world image can be tracked by the camera lens, and then transferred to the display and/or the display lens. Also, the lenses can bend light, which can result in distortion.

In some instances, because there are multiple lenses, each lens can distort the input image. Lens distortion correction can be applied to the multiple lenses, such that straight lines can remain straight as seen by the user. So lens distortion correction may attempt to ensure that straight lines are displayed as straight lines to the user, rather than as curved or distorted lines as a result of the lens distortion. Additionally, each lens can have different distortions. Further, the order of the lens distortion correction can matter, as the reversal of the lens distortion order may result in a different corrected image. Lens distortion can also include a number of different specifications. For example, lens distortion corrections may be mobile platform friendly, lens distortion corrections may be fast, e.g., 60 frames per second or more, and lens distortion corrections may leverage the GPU for performance aspects.

Some aspects of the present disclosure can utilize some aspects of double pass rendering. In double pass rendering, the camera image can be used as an input image. A first render pass can create and use a 3D mesh and/or application program interface (API) or OpenGL rendering to render the camera image with a camera lens distortion correction, i.e., straight lines may be straight. Aspects of the present disclosure can refer to this image as a rectified camera image. Also, in a render pass, the present disclosure can take an input image, then warp this image in order to create a new image.

A second render pass can create and use a 3D mesh and and/or API or OpenGL rendering to render a display image with a display lens distortion correction, i.e., straight lines may be bent. Aspects of the present disclosure can refer to this image as a pre-rectified display image. The pre-rectified display image can be shown on the display, and the image can then be distorted by the display lens. Further, the user can observe a rectified display image, where straight lines can be straight again. So aspects of the present disclosure can start with straight lines, and then bend the lines in the opposite direction of the distortion of the display lens. Accordingly, if the display lens bends the image to the left, then the present disclosure can bend the image to the right in order to counteract the display lens, and the image can appear straight.

Figure 3:
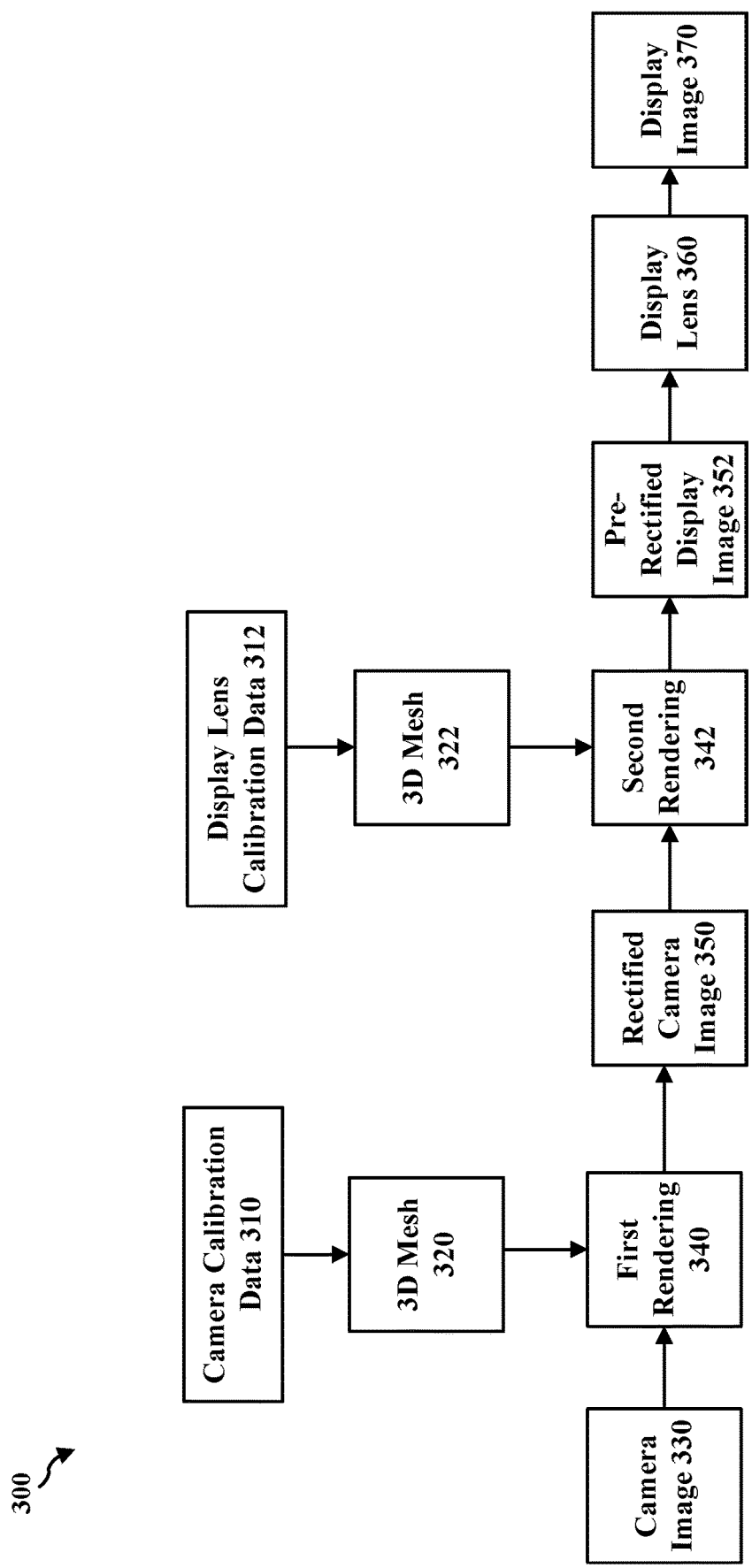
FIG. 3 illustrates an example diagram for lens distortion correction in accordance with one or more techniques of this disclosure.

FIG. 3 illustrates diagram 300 in accordance with one or more techniques of this disclosure. As shown in FIG. 3, diagram 300 includes camera calibration data 310, display lens calibration data 312, three dimensional (3D) mesh 320, 3D mesh 322, camera image 330, first rendering 340, rectified camera image 350, second rendering 342, pre-rectified display image 352, display lens 360, and display image 370. FIG. 3 shows one aspect of lens distortion correction according to the present disclosure.

In some aspects, camera image 330 can be from the tracking camera, which can appear to include a fish-eye lens distortion. This image can be calibrated, which can include information regarding the amount the image is bent or obscured. This information can also be used to create a 3D mesh 320, which can include a way to translate data or perform an image transformation. The 3D mesh 320 can perform a pinching effect on the camera image 330, such that it can eliminate the fisheye lens distortion on the image 330.

As shown in FIG. 3, camera calibration data 310 can be used to make 3D mesh 320, which can be combined with a camera image 330 for a first rendering 340. The first rendering 340 can be used to obtain a rectified camera image 350. After obtaining the rectified camera image 350, the present disclosure can bulge the image to pre-rectify the pinching of the display lens, e.g., display lens 360. Additionally, the display lens calibration data 312 can be used to make 3D mesh 322, which can be combined with the rectified camera image 350 to produce a second rendering 342. The second rendering 342 can then lead to a pre-rectified display image 352, which can bulge the image. The pre-rectified display image 352 can lead to the display lens 360, which can ultimately lead to the display image 370 viewed by the user.

As indicated above, in double pass rendering, the camera image can be used as an input image. However, double pass rendering can result in an increased rendering time, as well as an increased latency in an AR context. This can also result in increased GPU texture memory access, which can be costly. As such, there is a present need for a rendering process that can allow for a faster rendering time and/or reduced latency.

Some aspects of the present disclosure can utilize a single pass rendering in order to account for the aforementioned shortcomings of double pass rendering. In single pass rendering, aspects of the present disclosure can use a single 3D rendering to accomplish both of the aforementioned distortion corrections simultaneously. This single pass rendering can provide a number of advantages, such as a faster rendering time and/or reduced latency in an AR context. The single pass rendering can also result in less GPU data bandwidth usage of 3D mesh vertex and image pixel data. Additionally, the single pass rendering can result in a reduced GPU computation per vertex and pixel. Also, the single pass rendering can result in a reduced GPU texture memory access, which can be costly.

Single pass rendering can also result in an improved or sharper image quality. For example, each texture sample fetch can perform a bilinear interpolation between adjacent pixels. Also, a weighted averaging of pixels may result in a blurring effect on the fetched color sample. By reducing the number of texture fetches, aspects of the present disclosure can reduce or eliminate blurring.

Some aspects of single pass rendering can be difficult to resolve because image distortions can be both non-linear and non-commutative. A non-linear image distortion can mean that some pixels in the image are transformed a different manner. A non-commutative image distortion can mean that switching the order of distortions or performing the distortions simultaneously may not provide the same result as performing the distortions in one order.

Also, the image transformations that produce different effects, e.g., bulging and/or pinching the image, can be in different portions of the image. This can cause the image transformations to be difficult to predict. Also, the order to the image transformations can be important. In some aspects, non-commutative transformations can include a number of different distortions, e.g., a twirl distortion or a barrel distortion. As such, resulting image transformations may be different depending on whether a twirl distortion is performed prior to a barrel distortion, or vice versa.

Figure 4:
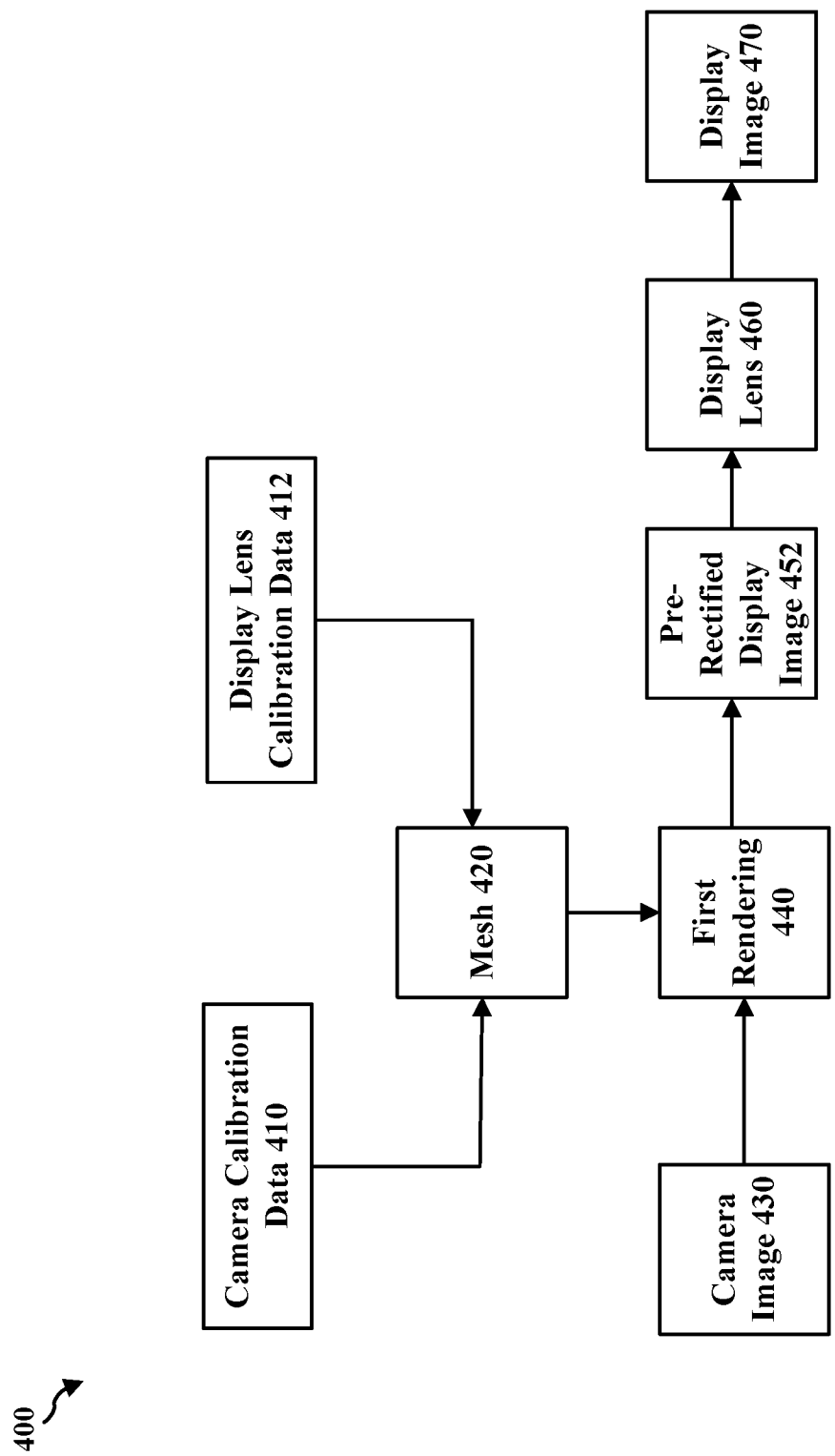
FIG. 4 illustrates an example diagram for lens distortion correction in accordance with one or more techniques of this disclosure.

FIG. 4 illustrates diagram 400 in accordance with one or more techniques of this disclosure. As shown in FIG. 4, diagram 400 includes camera calibration data 410, display lens calibration data 412, 3D mesh 420, camera image 430, first rendering 440, pre-rectified display image 452, display lens 460, and display image 470. FIG. 4 shows one aspect of lens distortion correction according to the present disclosure.

As shown in FIG. 4, single pass rendering according to the present disclosure can combine camera calibration data 410 with display lens calibration data 412. This combination can produce 3D mesh 420. The mesh 420 can be combined with a camera image 430 to produce first rendering 440. The first rendering 440 can be used to obtain a pre-rectified display image 452. The pre-rectified display image 452 can lead to the display lens 460, which can ultimately lead to the display image 470 viewed by the user.

In some aspects, single pass rendering according to the present disclosure can produce separate 3D meshes from the camera calibration data and the display lens calibration data. The mesh from the camera calibration data can be used to calculate first location information. In addition, a first horizontal (U) vertical (V) (UV) image or map can be determined based on the calculated first location information. In some aspects, calculating the first location information can correspond to rendering UV information as red (R), green (G), blue (B) (RGB) color information.

In some aspects, creating a UV image or map can be a 3D modeling process of projecting a two dimensional (2D) image to a 3D model's surface for texture mapping. For instance, a UV image or map can be a set of UV texture coordinates of the vertices of a mesh that correspond to the 3D or XYZ positional coordinates of the vertices of a mesh. For example, a UV image or map can be a set of two dimensional points that match each 3D or XYZ vertex point.

Additionally, a UV image can be a color image where a red (R) channel of a pixel corresponds to a value of a horizontal (U) texture coordinate, a green (G) channel of the pixel corresponds to a value of a vertical (V) texture coordinate, and a blue (B) channel of the pixel can be set to zero. In some aspects, a UV image can map a 3D triangle point to a 2D pixel of an image that can be used in texture mapping, i.e., wrapping an image around a 3D model. Also, a UV image can be referred to as a UV map, a UV render image, or a UV lookup texture.

The first UV image can be combined with the display lens calibration data mesh to calculate second location information. In some aspects, calculating the second location information can correspond to rendering input texture coordinate information. A second UV image can then be determined based on the second location information. Moreover, a third image mesh can be determined based on the determined second UV image. The third image mesh can be combined with a color camera image to produce additional location information, which can then produce the final image observed by the user at the display.

In some aspects, when producing the third image mesh, certain geometry positions can be converted to coordinate information. For example, three dimensional (XYZ) positions can be converted to UV texture coordinates. Also, in some aspects, the UV images mentioned above can be rendered with a checkerboard texture.

Figure 5:
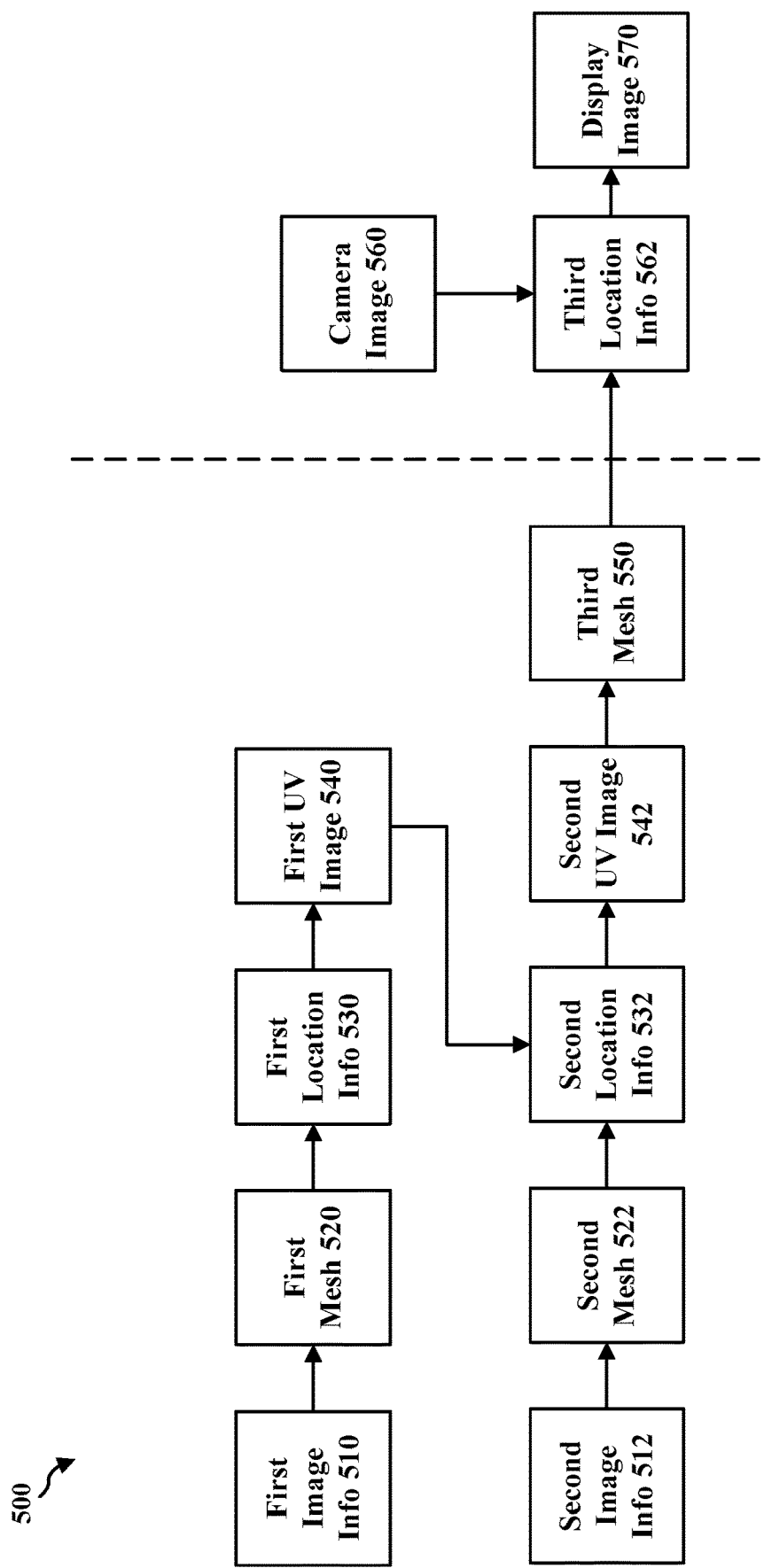
FIG. 5 illustrates an example diagram for lens distortion correction in accordance with one or more techniques of this disclosure.

FIG. 5 illustrates diagram 500 in accordance with one or more techniques of this disclosure. As shown in FIG. 5, diagram 500 includes camera calibration data or first image information 510, display lens calibration data or second image information 512, first mesh 520, second mesh 522, first location information 530, second location information 532, first UV image 540, second UV image 542, third mesh 550, camera image 560, third location information 562, and display image 570. FIG. 5 shows one aspect of single pass rendering for lens distortion correction according to the present disclosure. As shown in FIG. 5, the image from the camera is on the right of the dashed line, e.g., as taken by a user headset or head mounted display (HMD). Also, components to the left of the dashed line can be a one-time preprocess, and components to the right of the dashed line can be a run-time per frame processing. In FIG. 5, each image information, e.g., first image information 510 or second image information 512, can be associated with a different lens. For example, in FIG. 5, there can be two lenses, e.g., a first lens and a second lens, which correspond to first image information 510 and second image information 512, respectively. However, aspects of the present disclosure are not limited to a certain number of lenses, e.g., two lenses. As will be described below, the present disclosure can utilize four lenses, as well as any other appropriate amount of lenses, e.g., eight or sixteen lenses. Also, these multiple lenses may not need to be perfectly aligned with one another.

FIG. 5 displays that first mesh 520 can be based on first image information 510. Also, first location information 530 can be based on first mesh 520, and first UV image 540 can be based on first location information 530. Second mesh 522 can be based on second image information 512. Moreover, second location information 532 can be based on second mesh 522 and first UV image 540. Also, second UV image 542 can be based on second location information 532. Third mesh 550 can be based on second UV image 542. Further, third location information 562 can be based on camera image 560 and third mesh 550. Finally, display image 570 can be based on third location information 562.

As shown in FIG. 5, when a 3D mesh is rendered, e.g., first mesh 520 or second mesh 522, rather than producing an image, the present disclosure can calculate the location information for each pixel based on the 3D mesh. So aspects of the present disclosure can calculate the location information for each pixel from one or more meshes. Additionally, aspects of the present disclosure can determine a horizontal (U) vertical (V) (UV) image or UV lookup texture from this location information.

As indicated above, the present disclosure can determine a 3D mesh based on an image. When this image is mapped, the present disclosure can assign each pixel in the image a location coordinate. For example, each pixel can be assigned a horizontal (U) value, e.g., from 0 to 1, and a vertical (V) value, e.g., from 0 to 1. Aspects of the present disclosure can also postpone searching or looking-up the image produced by the camera. For instance, each time an image is searched or looked-up, the image quality can be reduced. Accordingly, aspects of the present disclosure can avoid including an intermediate image in the distortion solution.

In some instances, the aforementioned rendering can produce an image where the colors represent the location of the pixel, e.g., UV texture coordinates, from the camera image. For instance, these UV coordinate values can correspond to color coordinate values. So these coordinates can be addresses, which can be information from the image that allows each pixel to be determined. Also, the size and aspect ratio can correspond to the area of the display that is used to show the camera image.

Further, multiple meshes can be calculated which can include vertex positions and/or texture coordinates. As indicated above, this mesh can modify or alter an input image. Additionally, an application program interface (API) rendering or OpenGL rendering can be a texture map lookup operation. In some aspects, the incoming texture image can be distorted and output. The present disclosure can use high precision, e.g., 32 bit, floating point texture samples and/or output render buffers. Also, the UV image or map can be utilized as a texture to be used with another UV image or map.

In some aspects, in a second rendering pre-pass, the UV texture coordinates from the first lens correction can be the final texture coordinates, e.g., per pixel, that can allow for a vertex to determine its texture coordinates. So an image distortion process can be performed multiple times on a UV image or map. In some aspects, the process can be performed via a rendering of light distortion through multiple lenses. For example, the aforementioned image distortion process can mitigate the distortion from one lens onto another lens.

Additionally, aspects of the present disclosure can build a third 3D mesh and its corresponding texture coordinates, e.g., as a final runtime render mesh. In some aspects, this third mesh can be determined based on the coordinates of previous pixel information or UV information. So the third mesh can be calculated based on the location or color information of previous data. Also, the location information can be XYZ coordinates or UV coordinates. The geometry or XYZ positions can also be evenly spaced.

Moreover, the UV texture coordinates can be determined by looking up the value in a previously generated UV lookup texture or image. The present disclosure can also take into account sampling between pixels, e.g., by using bilinear interpolation. In some aspects, the present disclosure can generate warped UV texture coordinates. Further, the present disclosure can generate warped XYZ coordinates.

In addition, aspects of the present disclosure can utilize a number of different processes, such as rendering the location of a pixel and/or creating pixel lookup coordinates as image pixel output values. In these aspects, the color of a pixel can be rendered, rather than its location. Aspects of the present disclosure can also use the location image as an input texture into another distortion process, e.g., to further warp and/or recalculate the final location of the desired output pixel. Additionally, aspects of the present disclosure can use the final location to retrieve the color of the camera input image, e.g., a single time.

In some instances, aspects of the present disclosure may be utilized for a number of different lenses. For example, aspects of the present disclosure may be utilized by two, four, eight, sixteen, or any appropriate amount of lenses. Further, the lenses may not need to be perfectly aligned with one another.

Figure 6:
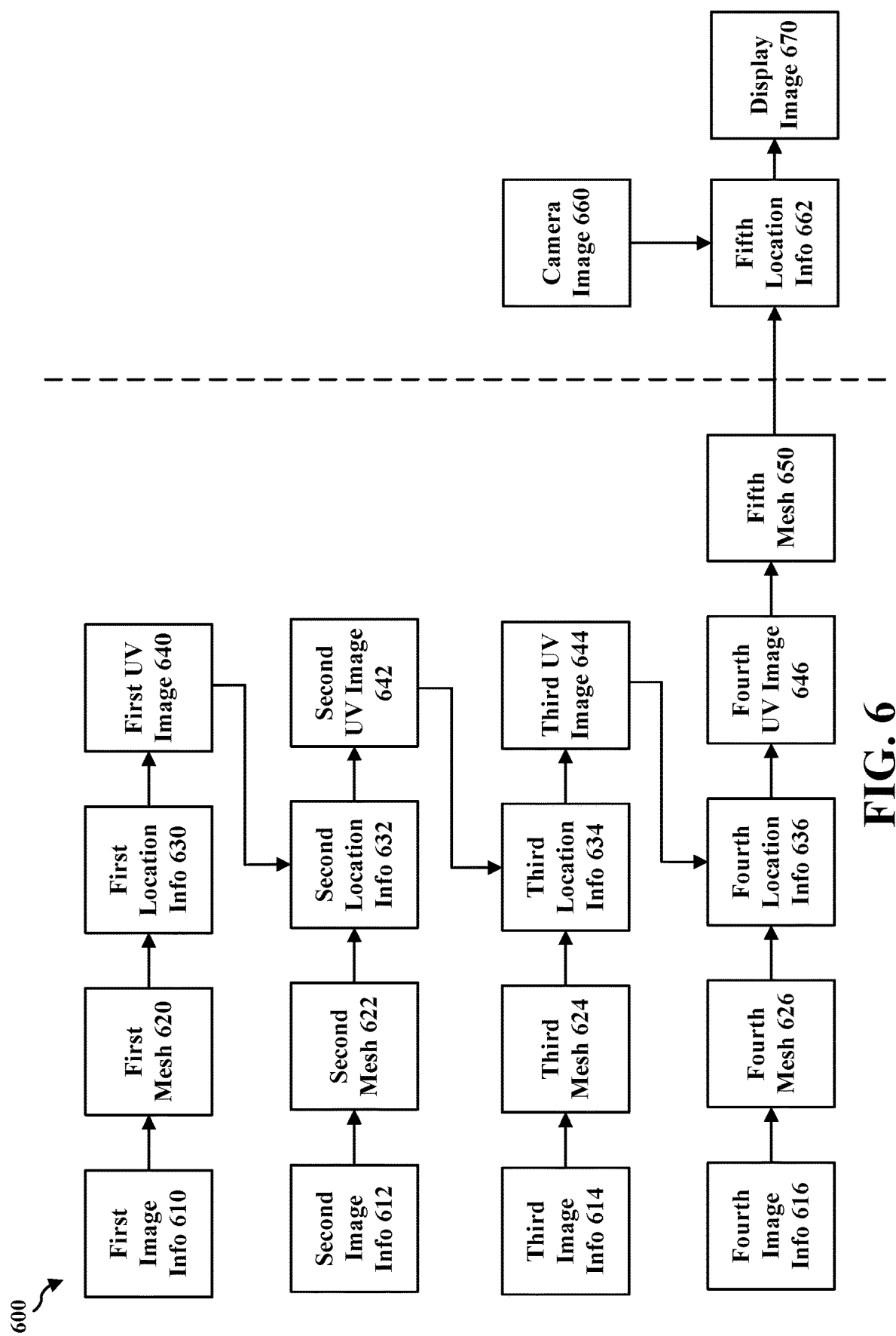
FIG. 6 illustrates an example diagram for lens distortion correction in accordance with one or more techniques of this disclosure.

FIG. 6 illustrates diagram 600 in accordance with one or more techniques of this disclosure. As shown in FIG. 6, diagram 600 includes first image information 610, second image information 612, third image information 614, fourth image information 616, first mesh 620, second mesh 622, third mesh 624, fourth mesh 626, first location information 630, second location information 632, third location information 634, fourth location information 636, first UV image 640, second UV image 642, third UV image 644, fourth UV image 646, fifth mesh 650, camera image 660, fifth location information 662, and display image 670. FIG. 6 shows one aspect of single pass rendering for lens distortion correction that utilizes multiple lenses, e.g., four lenses. As shown in FIG. 6, the image from the camera is on the right of the dashed line, e.g., as taken by a user headset or head mounted display (HMD).

FIG. 6 displays that each image information can be associated with a different lens. As shown in FIG. 6, there can be four lenses, e.g., a first lens, a second lens, a third lens, and a fourth lens, which correspond to the first image information 610, second image information 612, third image information 614, and fourth image information 616, respectively. Accordingly, aspects of the present disclosure are not limited to a certain number of lenses, e.g., two lenses. As shown in FIG. 6, the present disclosure can utilize four lenses, as well as any other appropriate amount of lenses, e.g., eight or sixteen lenses. Also, these multiple lenses may not need to be perfectly aligned with one another.

FIG. 6 displays that first mesh 620 can be based on first image information 610. Also, first location information 630 can be based on first mesh 620, and first UV image 640 can be based on first location information 630. Second mesh 622 can be based on second image information 612. Moreover, second location information 632 can be based on second mesh 622 and first UV image 640. Also, second UV image 642 can be based on second location information 632. Third mesh 624 can be based on third image information 614. Also, third location information 634 can be based on third mesh 624 and second UV image 642. Third UV image 644 can be based on third location information 634. Fourth mesh 626 can be based on fourth image information 616. Fourth location information 636 can be based on fourth mesh 626 and third UV image 644. Fourth UV image 646 can be based on fourth location information 636. Fifth mesh 650 can be based on fourth UV image 646. Further, fifth location information 662 can be based on camera image 660 and fifth mesh 650. Finally, display image 670 can be based on fifth location information 662.

In some aspects, the present disclosure can convert image space to camera space, e.g., from pixels to mm. The following formulas can be used: cameraX=(imageX−center_X)/focal_X; and cameraY=(imageY−center_Y)/focal_Y. In some instances, an image can be a certain amount of pixels, e.g., 640×400 pixels. Further, an image may include the following values: Center_X=324.5 pixels, Center_Y=198.8 pixels, field of view (FOV)=0.925 radians, Focal X=269.4 pixels, Focal Y=269.4 pixels. Also, in 3D camera space: −1.188 can correspond to +1.188 mm horizontal, and −0.742 can correspond to +0.742 mm vertical.

In some aspects, a mesh can be rendered using an application program interface (API) in order to correct the fisheye image distortion. For example, aspects of the present disclosure can utilize the following formula:

$$r_u = \frac{\tan(r_d \omega)}{2 \tan\frac{\omega}{2}}.$$

As shown in the above formula, $r_d$ is the fisheye (distorted) radius per vertex, i.e., the distance from a vertex to the center of the image mesh, w is the field of view in radians, and $r_u$ is the corrected (undistorted) radius per vertex.

Aspects of the present disclosure can also include display lens mesh generation. In some aspects, this can be the same method for calculating a pixel radius as described above. However, this calculation can utilize a mathematical formula that uses the radius parameter. In some aspects, the lens distortion polynomial can include a distortion scale, e.g., distortion scale=$K_0+K_1*r+K_2*r^2+K_3*r^3+K_4*r^4+K_5*r^5+K_6*r^6$. $K_0$, $K_1$, $K_2$, $K_3$, $K_4$, $K_5$, $K_6$ can be calibration numbers given by a lens manufacturer, and r can be the radius described above. The aforementioned formula can be used to calculate UV texture coordinates.

Additionally, aspects of the present disclosure can include other methods of multiple lens distortion correction. As described previously, the end result of distortion correction can be a mesh in which the UV texture coordinates are repositioned from a neutral position, i.e., no distortion, to a desired position, which may result in the desired image warping. In another method, the XYZ vertex positions of the 3D mesh may be modified to achieve the same warping. So the UV texture coordinates can remain untouched. This may be beneficial because of asynchronous space warp (ASW), another technique used in AR or VR, which may warp the image. In ASW, modifying the vertex positions may result in an improved end-to-end error, e.g., a 13.7% improvement, compared to modifying UV texture locations. Thus, in combining the lens correction and ASW, it can be beneficial to perform all the steps together in the XYZ space.

The XYZ distortion method can be similar to the method presented above, but the present disclosure can render vertex XYZ as a color for each lens correction. For example, red can be the X coordinate, green can be the Y coordinate, and blue can be the Z coordinate. In the first rendering, the present disclosure can also render texture UV as a color and save the image. In the second rendering, the present disclosure can use an XYZ color image from the first render pass. In a final mesh construction, the present disclosure can use the first UV color image render to determine the UV value. Also, the present disclosure can use the final XYZ image render to determine the final vertex positions.

Figure 7:
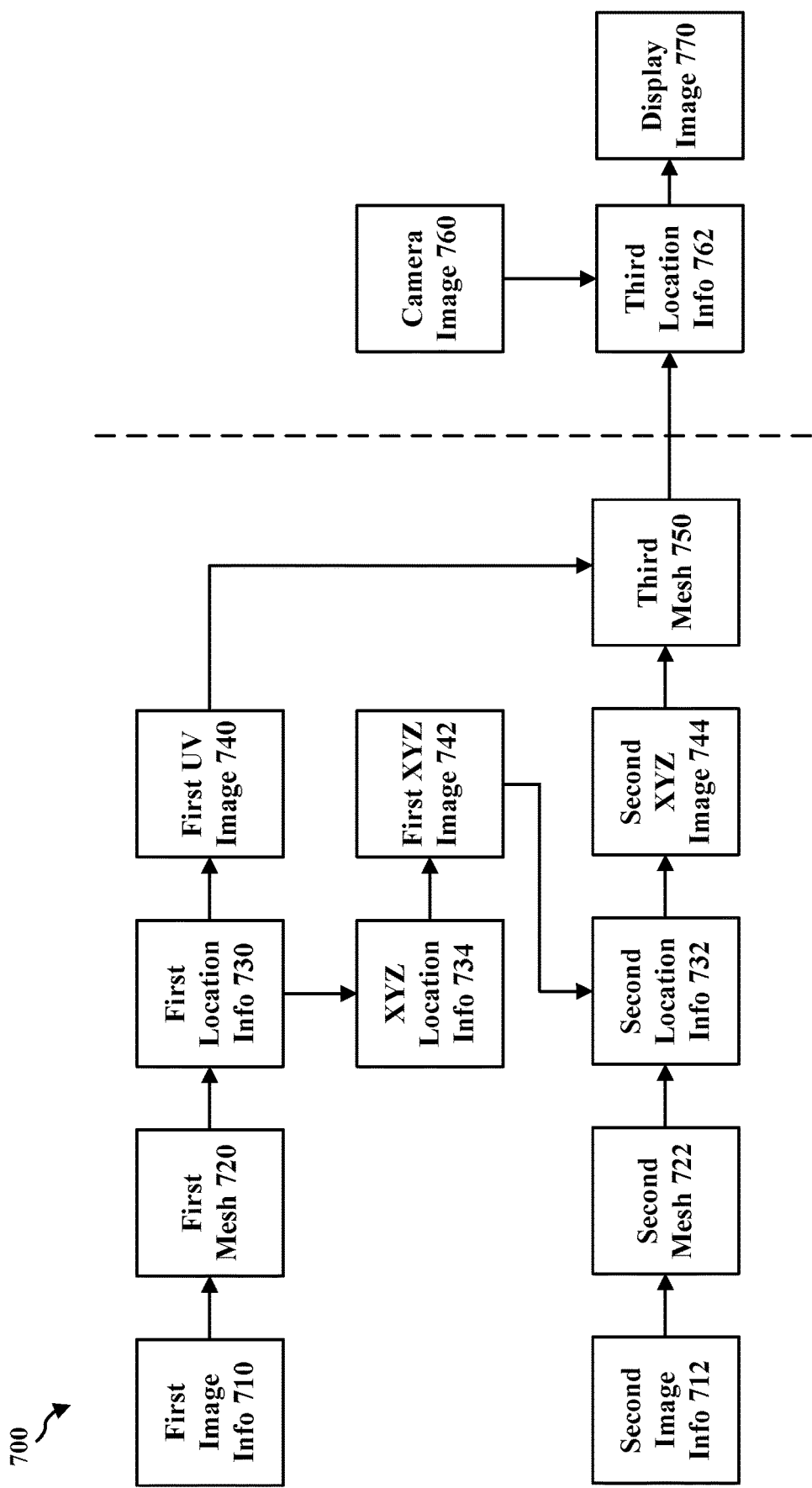
FIG. 7 illustrates an example diagram for lens distortion correction in accordance with one or more techniques of this disclosure.

FIG. 7 illustrates diagram 700 in accordance with one or more techniques of this disclosure. As shown in FIG. 7, diagram 700 includes camera calibration data or first image information 710, display lens calibration data or second image information 712, first mesh 720, second mesh 722, first location information 730, second location information 732, XYZ location information 734, first UV image 740, first XYZ image 742, second XYZ image 744, third mesh 750, camera image 760, third location information 762, and display image 770. FIG. 7 shows one aspect of single pass rendering based on the aforementioned XYZ method of lens distortion correction. As shown in FIG. 7, the image from the camera is on the right of the dashed line, e.g., as taken by a user headset or HMD.

FIG. 7 displays that first mesh 720 can be based on first image information 710. Also, first location information 730 can be based on first mesh 720, and first UV image 740 can be based on first location information 730. XYZ location information 734 can be based on first location information 730, and first XYZ image 742 can be based on XYZ location information 734. Second mesh 722 can be based on second image information 712. Moreover, second location information 732 can be based on second mesh 722 and first XYZ image 742. Also, second XYZ image 744 can be based on second location information 732. Third mesh 750 can be based on second XYZ image 744 and first UV image 740. Further, third location information 762 can be based on camera image 760 and third mesh 750. Finally, display image 770 can be based on third location information 762.

FIGS. 5-7 illustrate an example of the aforementioned processes for lens distortion correction. As shown in FIGS. 5-7, aspects of the present disclosure, e.g., servers and client devices herein, can perform a number of different steps or processes to correct lens distortion. For instance, servers and client devices herein may determine first image information, e.g., first image information 510, based on a first image or lens. Also, servers and client devices herein may generate a first image mesh, e.g., first mesh 520, based on the determined first image information, e.g., first image information 510. Servers and client devices herein may also determine second image information, e.g., second image information 512, based on a second image or lens. Moreover, servers and client devices herein may generate a second image mesh, e.g., second mesh 522, based on the determined second image information, e.g., second image information 512.

Servers and client devices herein may also calculate first location information, e.g., first location information 530, based on the first image mesh, e.g., first mesh 520. In some aspects, the first location information can be based on at least one of first pixel location information or first UV texture coordinates. In addition, servers and client devices herein can determine a first UV image, e.g., first UV image 540, based on the calculated first location information, e.g., first location information 530.

Also, servers and client devices herein can calculate second location information, e.g., second location information 532, based on a second image mesh, e.g., second mesh 522, and the determined first UV image, e.g., first UV image 540. In some aspects, the second location information can be based on at least one of second pixel location information or second UV texture coordinates. Servers and client devices herein can also determine a second UV image, e.g., second UV image 542, based on the calculated second location information, e.g., second location information 532. Additionally, servers and client devices herein can also generate a third image mesh, e.g., third mesh 550, based on the determined second UV image, e.g., second UV image 542.

Servers and client devices herein can also calculate third location information, e.g., third location information 562, based on the third image mesh, e.g., third mesh 550, and a camera image, e.g., camera image 560. Also, servers and client devices herein can determine a display image, e.g., display image 570, based on the calculated third location information, e.g., third location information 562. In some aspects, the generated third image mesh, e.g., third mesh 550, can be associated with at least one of an augmented reality (AR) application, an extended reality (XR) application, or a virtual reality (VR) application.

Servers and client devices herein can also calculate length (X) height (Y) depth (Z) (XYZ) location information, e.g., XYZ location information 734, based on the first location information, e.g., first location information 730. Servers and client devices herein can also determine a first XYZ image, e.g., first XYZ image 742, based on the calculated XYZ location information, e.g., XYZ location information 734. In some aspects, the second location information, e.g., second location information 732, can be calculated based on the second image mesh, e.g., second mesh 722, and the determined first XYZ image, e.g., first XYZ image 742.

Also, the second UV image can be a second XYZ image, e.g., second XYZ image 744. Further, the third image mesh, e.g., third mesh 750, can be generated based on the second XYZ image, e.g., second XYZ image 744, and the first UV image, e.g., first UV image 740. Moreover, the XYZ location information, e.g., XYZ location information 734, can be based on at least one of XYZ pixel location information or XYZ texture coordinates. In some aspects, a headset may apply an image mesh to a camera image input. Additionally, an apparatus may present an image comprising a camera and a renderer, where the renderer may be arranged to process images from the camera using a 3D mesh. In some instances, the apparatus may be a headset. Further, the first image mesh may be based on camera calibration data of a device. Also, the second image mesh may be derived from display lens calibration data of a display lens, e.g., used to present the image to a user from the display within the device.

Figure 8:
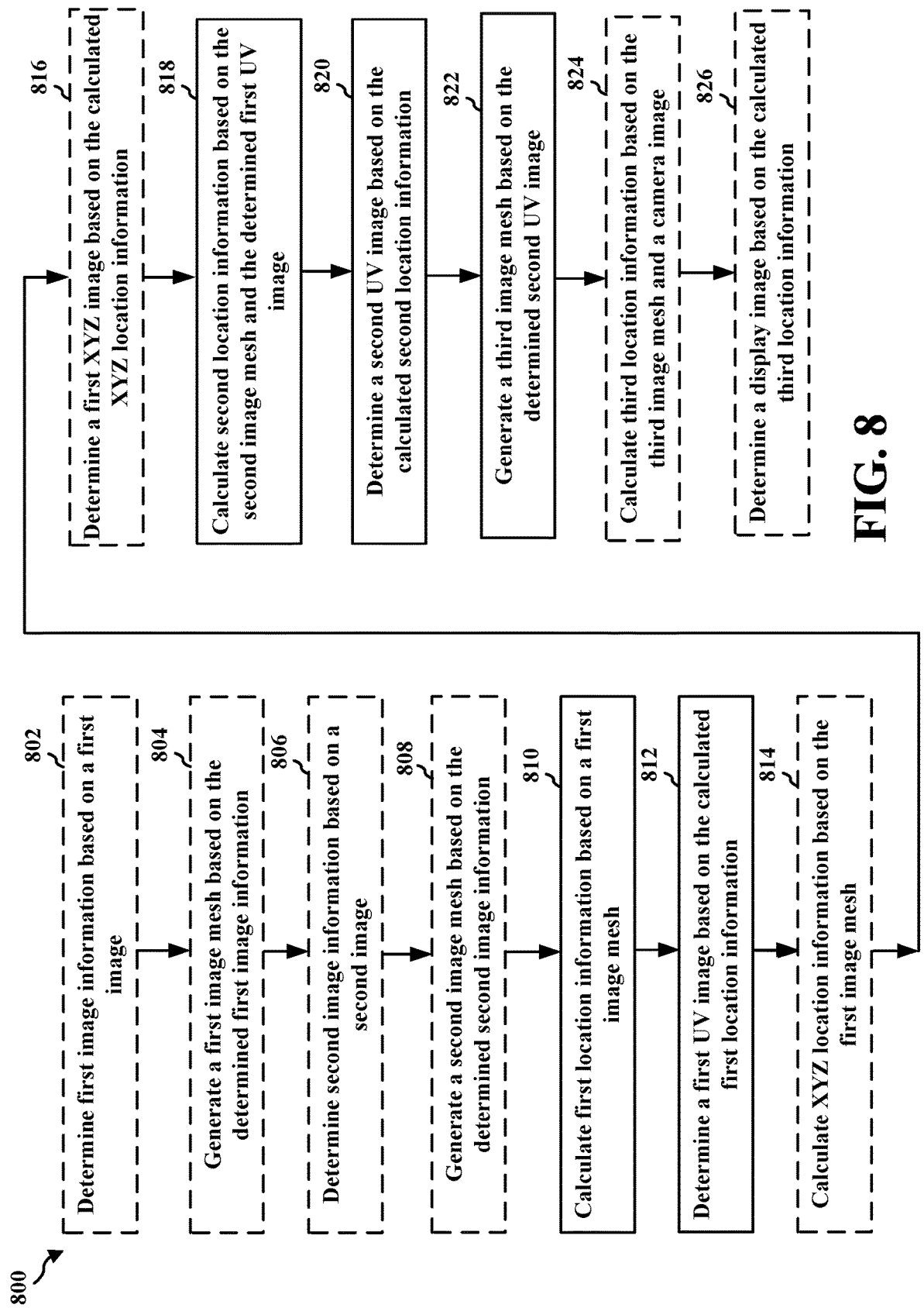
FIG. 8 illustrates an example flowchart of an example method in accordance with one or more techniques of this disclosure.

FIG. 8 illustrates an example flowchart 800 of an example method in accordance with one or more techniques of this disclosure. The method may be performed by an apparatus such as a headset, an HMD, a client device, a server, display processing unit, a display processor, a CPU, a GPU, or an apparatus for display or graphics processing. At 802, the apparatus may determine first image information based on a first image, as described in connection with the examples in FIGS. 3-7.

At 804, the apparatus can generate a first image mesh based on the determined first image information, as described in connection with the examples in FIGS. 3-7. At 806, the apparatus can also determine second image information based on a second image, as described in connection with the examples in FIGS. 3-7. At 808, the apparatus can generate a second image mesh based on the determined second image information, as described in connection with the examples in FIGS. 3-7.

At 810, the apparatus can also calculate first location information based on a first image mesh, as described in connection with the examples in FIGS. 3-7. In some aspects, the first location information can be based on at least one of first pixel location information or first UV texture coordinates, as described in connection with the examples in FIGS. 3-7. At 812, the apparatus can determine a first UV image based on the calculated first location information, as described in connection with the examples in FIGS. 3-7.

At 814, the apparatus can calculate length (X) height (Y) depth (Z) (XYZ) location information based on the first location information, as described in connection with the examples in FIGS. 3-7. At 816, the apparatus can determine a first XYZ image based on the calculated XYZ location information, as described in connection with the examples in FIGS. 3-7. In some aspects, the second location information can be calculated based on the second image mesh and the determined first XYZ image, as described in connection with the examples in FIGS. 3-7. Also, the second UV image can be a second XYZ image, as described in connection with the examples in FIGS. 3-7. Further, a third image mesh can be generated based on the second XYZ image and the first UV image, as described in connection with the examples in FIGS. 3-7. Moreover, the XYZ location information can be based on at least one of XYZ pixel location information or XYZ texture coordinates, as described in connection with the examples in FIGS. 3-7.

At 818, the apparatus can calculate second location information based on a second image mesh and the determined first UV image, as described in connection with the examples in FIGS. 3-7. In some aspects, the second location information can be based on at least one of second pixel location information or second UV texture coordinates, as described in connection with the examples in FIGS. 3-7. At 820, the apparatus can also determine a second UV image based on the calculated second location information, as described in connection with the examples in FIGS. 3-7. At 822, the apparatus can generate a third image mesh based on the determined second UV image, as described in connection with the examples in FIGS. 3-7.

At 824, the apparatus can calculate third location information based on the third image mesh and a camera image, as described in connection with the examples in FIGS. 3-7. At 826, the apparatus can determine a display image based on the calculated third location information, as described in connection with the examples in FIGS. 3-7. In some aspects, the generated third image mesh can be associated with at least one of an augmented reality (AR) application, an extended reality (XR) application, or a virtual reality (VR) application, as described in connection with the examples in FIGS. 3-7.

In one configuration, a method or apparatus for graphics processing is provided. The apparatus may be a headset, an HMD, a client device, a server, a display processing unit, a display processor, a CPU, a GPU, or some other processor that can perform display or graphics processing. In one aspect, the apparatus may be the processing unit 120 within the device 104, or may be some other hardware within device 104 or another device. The apparatus may include means for determining first image information based on a first image. The apparatus may include means for generating a first image mesh based on the determined first image information. The apparatus may include means for determining second image information based on a second image. The apparatus may include means for generating a second image mesh based on the determined second image information. The apparatus may include means for calculating first location information based on a first image mesh. The apparatus may include means for determining a first UV image based on the calculated first location information. The apparatus may include means for calculating second location information based on a second image mesh and the determined first UV image. The apparatus may include means for determining a second UV image based on the calculated second location information. The apparatus may include means for generating a third image mesh based on the determined second UV image. The apparatus may include means for calculating third location information based on the third image mesh and a camera image. The apparatus may include means for determining a display image based on the calculated third location information. The apparatus may include means for calculating length (X) height (Y) depth (Z) (XYZ) location information based on the first location information. The apparatus may include means for determining a first XYZ image based on the calculated XYZ location information.

The subject matter described herein can be implemented to realize one or more benefits or advantages. For instance, the described graphics processing techniques can be used by a headset, an HMD, a client device, a server, a display processing unit, a display processor, a GPU, a CPU, or some other processor that can perform display or graphics processing to implement the lens distortion correction techniques described herein. This can also be accomplished at a low cost compared to other display or graphics processing techniques. Moreover, the display or graphics processing techniques herein can improve or speed up data processing or execution. Further, the display or graphics processing techniques herein can improve resource or data utilization and/or resource efficiency. Additionally, aspects of the present disclosure can utilize a lens distortion correction process that can result in faster rendering time and/or reduced latency. The lens distortion correction process can also result in less GPU data bandwidth usage. Additionally, the lens distortion correction process can result in reduced GPU computation per vertex and pixel and/or reduced GPU texture memory access. The lens distortion correction process can also result in improved or sharper image quality.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, may include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of display processing, comprising:
 calculating first location information based on a first image mesh, wherein the first image mesh is based on first image information for a first image, wherein the first image information corresponds to camera calibration data;

determining a first horizontal (U) vertical (V) (UV) image based on the calculated first location information, wherein the first UV image is associated with first UV texture coordinates;

calculating second location information based on a second image mesh and the determined first UV image, wherein the second image mesh is based on second image information for a second image, wherein the second image information corresponds to display lens calibration data;

determining a second UV image based on the calculated second location information, wherein the second UV image is associated with second UV texture coordinates;

generating a third image mesh based on the determined second UV image;

calculating third location information based on the third image mesh and a camera image, wherein the camera image is a color camera image, such that the third location information is calculated based on the third image mesh and the color camera image; and obtaining a display image based on the calculated third location information, the third image mesh, and the camera image.

2. The method of claim 1, further comprising:
determining the first image information based on the first image.

3. The method of claim 2, further comprising:
generating the first image mesh based on the determined first image information.

4. The method of claim 1, further comprising:
determining the second image information based on the second image.

5. The method of claim 4, further comprising:
generating the second image mesh based on the determined second image information.

6. The method of claim 1, further comprising:
calculating length (X), height (Y), and depth (Z) (XYZ) location information based on the first location information; and
determining a first XYZ image based on the calculated XYZ location information, wherein the first XYZ image is associated with first XYZ positional coordinates.

7. The method of claim 6, wherein the second location information is further calculated based on the determined first XYZ image.

8. The method of claim 7, wherein the second UV image is mapped to a second XYZ image, wherein the second XYZ image is associated with second XYZ positional coordinates.

9. The method of claim 8, wherein the third image mesh is further generated based on the second XYZ image and the first UV image.

10. The method of claim 1, wherein the first location information is based on the first UV texture coordinates.

11. The method of claim 1, wherein the second location information is based on the second UV texture coordinates.

12. The method of claim 6, wherein the XYZ location information is based on XYZ texture coordinates.

13. The method of claim 1, wherein the generated third image mesh is associated with at least one of an augmented reality (AR) application, an extended reality (XR) application, or a virtual reality (VR) application.

14. An apparatus for display processing, comprising:
a memory; and
at least one processor coupled to the memory and configured to:
calculate first location information based on a first image mesh, wherein the first image mesh is based on first image information for a first image, wherein the first image information corresponds to camera calibration data;
determine a first horizontal (U) vertical (V) (UV) image based on the calculated first location information, wherein the first UV image is associated with first UV texture coordinates;
calculate second location information based on a second image mesh and the determined first UV image, wherein the second image mesh is based on second image information for a second image, wherein the second image information corresponds to display lens calibration data;
determine a second UV image based on the calculated second location information, wherein the second UV image is associated with second UV texture coordinates;
generate a third image mesh based on the determined second UV image;
calculate third location information based on the third image mesh and a camera image, wherein the camera image is a color camera image, such that the third location information is calculated based on the third image mesh and the color camera image; and
obtain a display image based on the calculated third location information, the third image mesh, and the camera image.

15. The apparatus of claim 14, wherein the at least one processor is further configured to:
determine the first image information based on the first image.

16. The apparatus of claim 15, wherein the at least one processor is further configured to:
generate the first image mesh based on the determined first image information.

17. The apparatus of claim 14, wherein the at least one processor is further configured to:
determine the second image information based on the second image.

18. The apparatus of claim 17, wherein the at least one processor is further configured to:
generate the second image mesh based on the determined second image information.

19. The apparatus of claim 14, wherein the at least one processor is further configured to:
calculate length (X), height (Y), and depth (Z) (XYZ) location information based on the first location information; and
determine a first XYZ image based on the calculated XYZ location information, wherein the first XYZ image is associated with first XYZ positional coordinates.

20. The apparatus of claim 19, wherein the at least one processor is configured to calculate the second location information further based on the determined first XYZ image.

21. The apparatus of claim 20, wherein the second UV image is mapped to a second XYZ image, wherein the second XYZ image is associated with second XYZ positional coordinates.

22. The apparatus of claim 21, wherein the at least one processor is configured to generate the third image mesh further based on the second XYZ image and the first UV image.

23. The apparatus of claim 14, wherein the first location information is based on the first UV texture coordinates.

24. The apparatus of claim 14, wherein the second location information is based on the second UV texture coordinates.

25. The apparatus of claim 19, wherein the XYZ location information is based on XYZ texture coordinates.

26. The apparatus of claim 14, wherein the generated third image mesh is associated with at least one of an augmented reality (AR) application, an extended reality (XR) application, or a virtual reality (VR) application.

27. An apparatus for display processing, comprising:
means for calculating first location information based on a first image mesh, wherein the first image mesh is based on first image information for a first image, wherein the first image information corresponds to camera calibration data;
means for determining a first horizontal (U) vertical (V) (UV) image based on the calculated first location information, wherein the first UV image is associated with first UV texture coordinates;
means for calculating second location information based on a second image mesh and the determined first UV image, wherein the second image mesh is based on second image information for a second image, wherein the second image information corresponds to display lens calibration data;
means for determining a second UV image based on the calculated second location information, wherein the second UV image is associated with second UV texture coordinates;
means for generating a third image mesh based on the determined second UV image;
means for calculating third location information based on the third image mesh and a camera image, wherein the camera image is a color camera image, such that the third location information is calculated based on the third image mesh and the color camera image; and
means for obtaining a display image based on the calculated third location information, the third image mesh, and the camera image.

28. The apparatus of claim 27, further comprising:
means for determining the first image information based on the first image.

29. The apparatus of claim 28, further comprising:
means for generating the first image mesh based on the determined first image information.

30. The apparatus of claim 27, further comprising:
means for determining the second image information based on the second image.

31. The apparatus of claim 30, further comprising:
means for generating the second image mesh based on the determined second image information.

32. The apparatus of claim 27, further comprising:
means for calculating length (X), height (Y), and depth (Z) (XYZ) location information based on the first location information; and
means for determining a first XYZ image based on the calculated XYZ location information, wherein the first XYZ image is associated with first XYZ positional coordinates.

33. The apparatus of claim 32, wherein the second location information is further calculated based on the determined first XYZ image.

34. The apparatus of claim 33, wherein the second UV image is mapped to a second XYZ image, wherein the second XYZ image is associated with second XYZ positional coordinates.

35. The apparatus of claim 34, wherein the third image mesh is further generated based on the second XYZ image and the first UV image.

36. The apparatus of claim 27, wherein the first location information is based on the first UV texture coordinates.

37. The apparatus of claim 27, wherein the second location information is based on the second UV texture coordinates.

38. The apparatus of claim 32, wherein the XYZ location information is based XYZ texture coordinates.

39. The apparatus of claim 27, wherein the generated third image mesh is associated with at least one of an augmented reality (AR) application, an extended reality (XR) application, or a virtual reality (VR) application.

40. A non-transitory computer-readable medium storing computer executable code for display processing, the code when executed by a processor causes the processor to:
calculate first location information based on a first image mesh, wherein the first image mesh is based on first image information for a first image, wherein the first image information corresponds to camera calibration data;
determine a first horizontal (U) vertical (V) (UV) image based on the calculated first location information, wherein the first UV image is associated with first texture coordinates;
calculate second location information based on a second image mesh and the determined first UV image, wherein the second image mesh is based on second image information for a second image, wherein the second image information corresponds to display lens calibration data;
determine a second UV image based on the calculated second location information, wherein the second UV image is associated with second UV texture coordinates;
generate a third image mesh based on the determined second UV image;
calculate third location information based on the third image mesh and a camera image, wherein the camera image is a color camera image, such that the third location information is calculated based on the third image mesh and the color camera image; and
obtain a display image based on the calculated third location information, the third image mesh, and the camera image.

* * * * *